Sept. 8, 1931.  R. E. MITTON  1,822,665
BRAKE SYSTEM
Filed Sept. 4, 1928  2 Sheets-Sheet 1

Inventor.
Robert E. Mitton
by R M Thomas
Attorney

Sept. 8, 1931.  R. E. MITTON  1,822,665
BRAKE SYSTEM
Filed Sept. 4, 1928   2 Sheets-Sheet 2
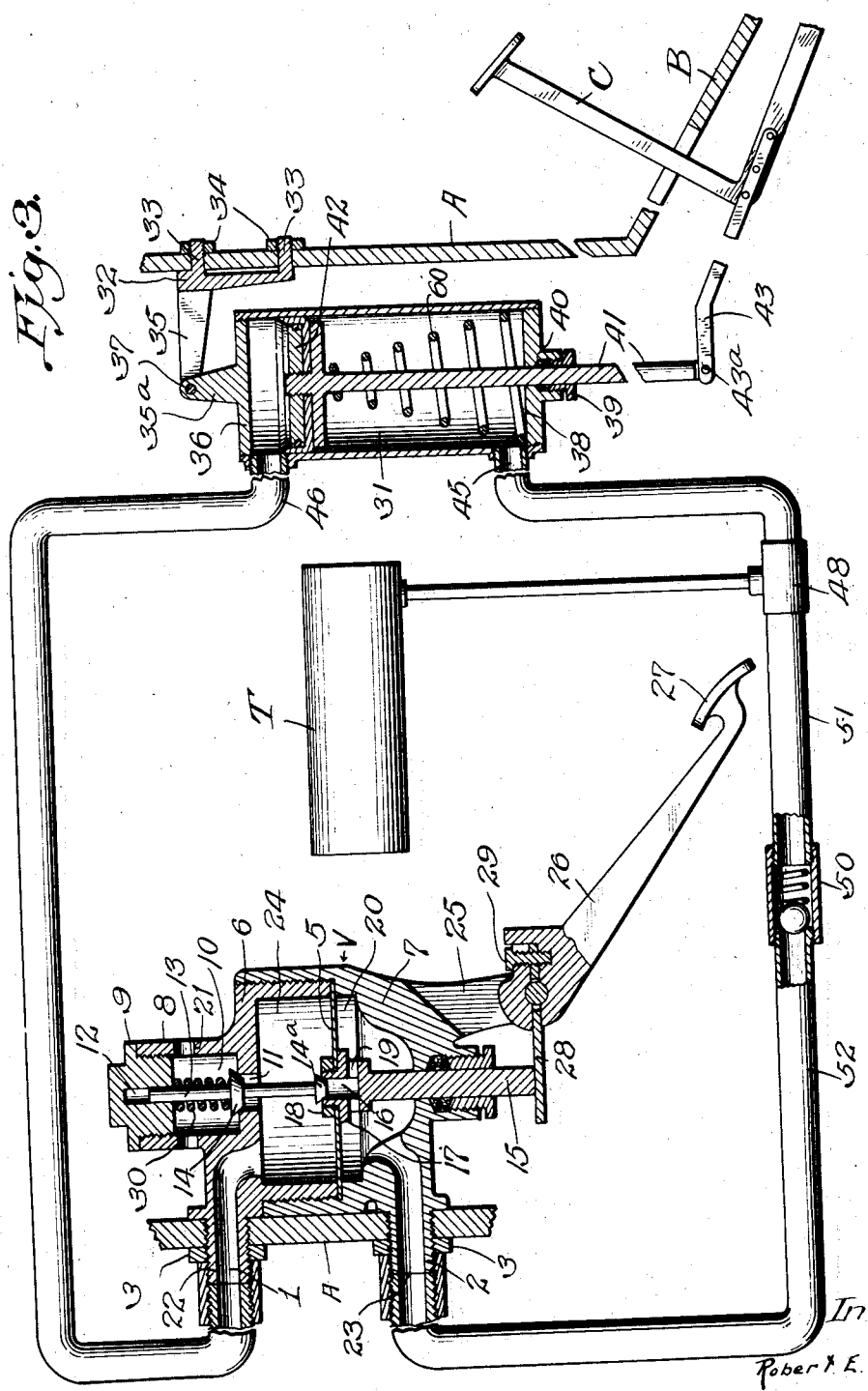

Patented Sept. 8, 1931

1,822,665

UNITED STATES PATENT OFFICE

ROBERT E. MITTON, OF SALT LAKE CITY, UTAH

BRAKE SYSTEM

Application filed September 4, 1928. Serial No. 303,891.

My invention relates to brake operating mechanisms, and more particularly to brake operating mechanisms which use the pressure of the atmosphere as the power to apply the brakes. A further object is to provide a brake system which will eliminate the use of much of the parts commonly used in the present air brakes.

A still further object is to provide a brake system for automobiles which will actuate the brakes of the car by the pressure of the atmosphere operating against a vacuum maintained in the operating cylinder by the suction of the intake manifold.

A still further object is to provide a brake system which will be actuated by vacuum suction and which system will be controlled by a manually operated valve which valve is in open connection with the air of the atmosphere and when the valve is operated the pressure of the air in the atmosphere will rush into the maintained vacuum and operate the brakes by the pressure thereby created and exerted.

These objects I accomplish with the device illustrated in the accompanying drawings in which similar numerals and letters of reference indicate like parts throughout the several views and as described in the specification forming a part of this application and pointed out in the appended claims.

Figure 1:
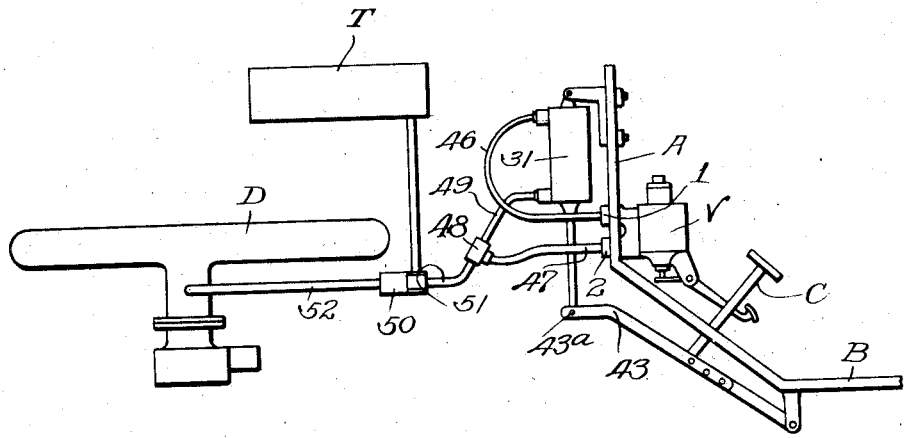
Figure 2:
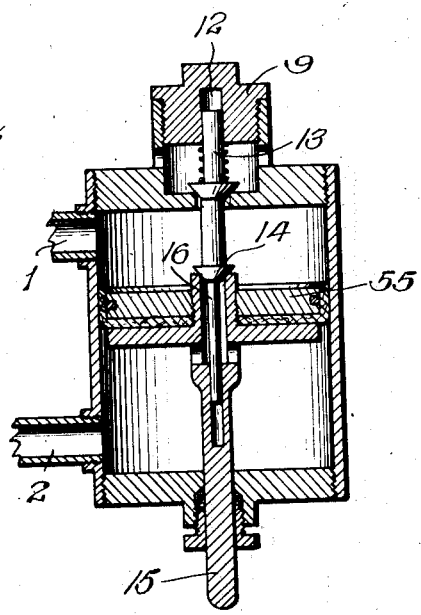

In the drawings in which I have shown the best and most preferred manner of shown the best and most preferred manner building my invention Figure 1 is a diagrammatic view of my device shown installed on the dash board of an automobile. Figure 2 is a diametrical section of a piston type valve which may be used to control the vacuum. Figure 3 is a diametrical vertical section of the diaphragm control valve and the operating cylinder with the air connection lines shown in dashes and arrows.

In the drawings I have shown the dash board of the automobile as A, the floor boards as B, the brake operating foot lever as C and the intake manifold of the engine as D.

I provide a control valve V, secured through the dash board A by the two air line connections 1 and 2 which are externally threaded to receive the lock nuts 3, which nuts hold the valve rigidly to the board. The said valve is of the diaphragm type having a diaphragm 5 carried between the two cylindrical portions 6 and 7 which portions when screwed together form the cylindrical casing of the valve. The top end of the casing portion 6 is provided with a centrally disposed boss 8 which boss is bored and threaded to receive a closure cap 9 and to form a chamber 10 below the cap 9, with the lower side of the chamber partially closed and bored to form a passage or port 11 between the chamber 10 and the interior of the casing with the top side of the bore chamferred to form a valve seat. The said cap 9 is centrally bored from the bottom side at 12 within which a guide rod and valve stem 13 is carried and in which bore 12 the rod is longitudinally operable. A valve 14 is formed medially on the said stem 13 and is normally adapted to seat on the valve seat in the port 11, and another valve 14a is formed on the lower free end of the said stem. A control rod 15 is provided through a suitably packed hole bored centrally through the bottom side of the cylinder portion 7 and the top end of the said rod is enlarged and a central bore 16 is provided therein with the top end of the said bore chamferred to form a valve seat therein, in which the valve 14a is normally held seated. A flange 17 is provided on the said rod 15 and the top end of the said rod is passed through a central bore in the diaphragm 5, with a nut 18 screwed onto the free end of the said rod 15 to hold the rod and diaphragm rigidly together so that any movement of the diaphragm will be transmitted to the rod and any movement of the rod will move the diaphragm. Ports 19 are bored through the side wall of the rod 15 connecting the bore 16 with the chamber 20 below the diaphragm, and ports 21 are bored through the side wall of the boss 8 connecting the chamber 10 with the outside atmosphere. The said air line connections 1 and 2 are bored at 22 and 23 providing ports through which the air may pass from either the chamber 24 above the diaphragm 5 or from the chamber 20 below the said diaphragm. Two spaced apart support brackets 25 are provided on the lower side of the portion 7 and an operating control lever 26 is pivotally mounted therebetween with the foot piece 27 formed on the lower free end thereof. A flat spring 28 is secured to the top end of the lever 26 by the set screw 29 and the free end of the said spring is placed under the lower end of the control rod 15 to actuate the rod by the movement of the lever 26 and the tension of the spring 28. A coil spring 30 is carried around the valve stem 13 to normally hold the said valve 14 seated and to return it to its seat after each operation of the control lever 15.

An operating cylinder 31 is then pivotally mounted to the dash board A by the support bracket 32, said bracket being provided with spaced apart threaded lugs 33 on the back side thereof on which nuts are screwed to hold the bracket to the dash board, and the front side of the bracket is made with spaced apart members 35 between which the support lug 35a of the cylinder cap 36 is carried and supported by the pivot pin 37 being passed through the members 35 and the lug 35a. The said cylinder is closed at the top end by the cap 36 being screwed therein and the bottom end of the cylinder is closed by the plate 38. Centrally on the said plate 38 I provide a packing member 39 around a central bore 40 and a connecting rod 41 is carried and operated through the said bore 40. The top end of the said rod 41 is secured in a piston 42 which piston is operable longitudinally in the said cylinder 31, and the lower end of the said rod is pivoted between two spaced apart brackets 43 by the pin 43a and which brackets are secured to the brake operating foot lever C so that when the piston is moved longitudinally within the cylinder the foot lever C is operated and the brakes of the automobile actuated. Air hose connections 44 and 45 are provided in the side wall of the said cylinder 31 with the connection 44 above the travel of the piston 42 and is connected by a hole 46 with the air connection 1 of the valve V. Another air hose 47 is secured on the connection 2 of the valve V and is connected with a T-coupling 48 with one end of the said coupling 48 connected with the connection 45 by the hose 49 and the other end of the T-coupling is connected with one end of a check valve 50 by the line 51. The other end of the check valve is connected with the intake manifold D, of the automobile engine by the line 52.

In the piston type of valve shown in Figure 2, the only difference is that instead of the diaphragm 5 of the valve V, I provide a piston 55 which slides longitudinally within the outer chamber and which piston accomplishes the same functions accomplished by the diaphragm valve. The valve 14 in each type of valve is normally open and does not close until the operator moves the rod 15, either moving the diaphragm or the piston, depending upon the type of valve used. A tank T in the line 51 provides excess vacuum for other operations of the brake.

The operation of my invention is as follows:

The suction from the intake manifold drawing atmospheric pressure through the check valve 50 and the T 48 simultaneously submerges the valve, cylinder and tank in a vacuum passing through the port 45 into the bottom of the cylinder, through the port 23 in the bottom of the valve, through the ports 19, around the valve head 14a, which is normally open, through the port 22, from the connection 44 in the top of the cylinder and also the tank T.

When the brakes are to be applied the operator presses the control throttle 27 impinging spring tension from the spring 28 upon the end of the operating rod 15. The extent of this tension determines the degree of pressure allowed to pass to the brake chamber as follows: the upward movement of the rod 15 closes the valve 14a and opens the valve 14. The closing of valve 14a, it will be seen segregates the top of the valve from the bottom of same, leaving the top chamber of same in open connection with the top chamber of the power cylinder, as well as the bottom chamber of the valve, in open connection with the bottom of the power cylinder, when the valve 14 opens atmospheric pressure enters the top of the valve and thence to the top of the cylinder causing same to apply the brakes, however as the pressure in the top of the valve is the same as in the top of the cylinder, it is obvious that a depressing pressure will be thrown against the spring 28 and bending same backward when sufficient pressure has passed through the valve 14 to balance the spring tension originally applied at the end of the rod 15 by means of the pedal 27 until the intake valve 14 is thus automatically closed, preventing the influx of any further pressure. Should an increased tension be then applied to the pedal 27, this would repeat the above operation until the pressure in the top chamber of the valve again equaled the degree of tension upon said spring 28. In this way it will be obvious that an unlimited range of pressures may be admitted to the system according to the tension applied by means of the spring 28.

The release of the brakes is brought about by partial or total release of the pedal 28 thus diminishing the tension upon the spring 28. The extent of this relaxation or diminishing tension upon the spring 28 determines the amount of pressure allowed to be sucked out of the system effecting the release of the brakes.

The relaxation of the tension upon the rod 15 permits the pressure in the top of the valve to blow the release valve 14a open until sufficient pressure has exhausted to the point where the spring 28 again automatically closes same and holds the balance of the pressure in the system preventing any further exhaustion unless a further relaxation upon the spring tension 28 be permitted. It will be obvious that while the brakes are being held in the applied position with a given degree of atmospheric pressure in the upper chamber of the valve, that should any leakage of the system diminish said pressure, then the spring 28 would automatically keep opening and closing the intake valve 14 because of the fluxation of resistance thrown against the diaphragm 5, thus automatically replacing such leakage in degree with the control pedal 27 held manually in any given applied position.

The tank T is large enough when submerged in a vacuum to absorb several charges of atmospheric pressure caused by the operation of the brakes, thus providing reserve stopping power even though the engine should cease running. In the design of the cylinder 31 it will be seen that the area of the top of the piston is larger than the area of the bottom of same because of the piston rod, thus the brakes are held in release and returned to the primary position after an application by means of suction; a spring 60 is shown to supplement the suction releasing power.

The hookup as shown is applied without disturbing the effectiveness of the mechanical brake which is left intact.

Having thus described my invention I desire to secure by Letters Patent and claim:

1. A fluid braking mechanism, the combination of a power chamber with tubular connections at both ends, said chamber secured or hinged to the dashboard of a motor vehicle, an actuation rod slidably operable through a packing gland in one end of said power cylinder, said rod operatively connected to an extension secured upon the conventional brake pedal.

2. A fluid braking mechanism comprising a power chamber, tubular connections in each end of said chamber, a diaphragm rod slidably operable through one end of said chamber, the said packing gland, said rod operable by means of application of pressure to either side of such diaphragm or piston, a tank for the storage of reserve vacuum power in open connection with the intake manifold of an internal combustion engine, a check valve between said valve and said manifold, arranged to prevent the passage of atmospheric pressure back into said tank from said manifold, means to utilize as shown the stored vacuum energy to apply a plurality of effective braking operations without the motor of the vehicle running, means to control the fluctuations of such brake pressures as desired by a remotely connected and independently operated control valve.

3. A vacuum braking mechanism for motor vehicles, the combination of a power chamber, a movable partition within said chamber, a rod operable by the movements of said partition, an actuation rod attached to said partition and slidably operable through one end of said chamber, a control valve mounted upon the dashboard of the vehicle, a movable partition within said valve, an operating rod projecting through a packing gland in one end of said valve, the said packing gland, said rod attached to said movable partition, a central bore in one end of said rod, a valve seat on the end of said bore, perforations through the side wall of said bored rod providing a by pass through said valve partition, a release valve head arranged to close the seat in said rod when same is operated toward said valve head, an intake valve to admit atmospheric pressure to said valve, means to utilize the atmospheric pressure impinged upon the said movable partition to automatically close said intake valve according to the extent of the original pressure applied to the said rod as well as open the release valve by means of said atmospheric pressure when the original pressure imposed upon the said rod is relaxed or diminished, a spring to hold said intake valve normally closed, a spring contact between said rod and the member where the manual pressure is applied, means to manually apply and automatically cut off accumulation of pressure in the brake system, means to manually release and automatically cut off exhaustion of braking pressure and means to automatically replace any pressure dissipated through leakage while the brakes are in the applied position, a tank to store sufficient vacuum to permit of a plurality of stops without the motor of the vehicle running, said tank in open connection with the intake manifold of the engine, a check valve arranged to prevent the passage from the said manifold into said tank.

4. In a brake operating mechanism the combination of a valve, and an operating cylinder, one mounted within the dashboard of an automobile and the other without; a piston operable within said cylinder having its connecting rod secured to and operating the brake pedal of the automobile whenever the piston is moved in the cylinder; pipes connecting the valve with the top and bottom of the cylinder, with a pipe leading from the bottom pipe to the intake manifold of the automobile engine; a check valve in said last mentioned pipe; air ports in the top of said valve adapted to allow atmospheric pressure to enter said valve when it has been operated;

and valves within said valve to control the flow of pressure into the cylinder and the suction of the intake manifold from both ends of the cylinder.

5. In a brake operating mechanism the combination of a cylinder mounted above and having the piston therein connected with the brake pedal of an automobile; a valve to control the pressure of air and the suction above said piston and the amount of suction below it; pipes connecting said valve and said piston; and a check valve controlled pipe connecting the lower end of said cylinder and valve with the intake manifold of the automobile engine.

In testimony whereof I have affixed my signature.

ROBERT E. MITTON.